Figure 1:
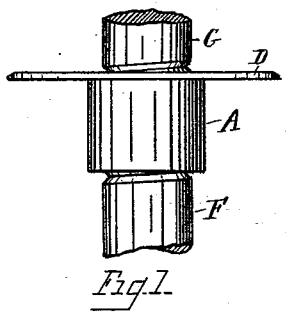

(No Model.)

V. SEEGER.
COMBINED PIPE COUPLING VALVE AND PLATE.

No. 455,008. Patented June 30, 1891.

WITNESSES
Carroll J. Webster
Anna J. Gehaney

INVENTOR
Valentine Seeger
By Myers & Webster
Atty

UNITED STATES PATENT OFFICE.

VALENTINE SEEGER, OF TOLEDO, OHIO.

COMBINED PIPE-COUPLING VALVE AND PLATE.

SPECIFICATION forming part of Letters Patent No. 455,008, dated June 30, 1891.

Application filed October 20, 1890. Serial No. 368,681. (No model.)

*To all whom it may concern:*

Be it known that I, VALENTINE SEEGER, of Toledo, county of Lucas, and State of Ohio, have invented certain new and useful Improvements in a Combined Pipe-Coupling Valve and Plate; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to a combined pipe-coupling valve and plate, and has for its object to provide a coupling for pipes having also a valve-seat for coaction with a valve for closing the coupling when the pipe is removed, and that shall by means of a plate be adapted to not only be firmly secured to the floor or wall, but that shall present a finished appearance to the same when in position and the pipe connected or when the pipe is disconnected and the valve in place.

The invention consists in the parts and combination of parts hereinafter described, and pointed out in the claims.

It is to be understood that my invention is designed to establish a permanent and finished coupling between the service-pipe and the fixtures within the room and to afford means when the fixtures are removed for not only sealing the service-pipe by means of a valve seated upon a valve-seat within the coupling, but to provide a plate to the coupling, which, in coaction with the valve, will present a finished appearance to the room from which the fixtures have been disconnected.

While my invention is applicable to piping of all character and purpose, it is especially designed for use in piping natural gas for domestic use, wherein the stoves and fixtures are removed during the heated term and it is desired to disconnect the stove and pipes from the main supply-pipe and to effectually prevent the escape of gas into the room, this result to be attained by means that shall not detract from the appearance of the room. I accomplish this object by means of a coupling provided with a valve-seat centrally of its length and screw-threaded portions upon either side of the same, with a plate integral with the coupling adapted to be secured to the floor or wall, by which means the service-pipe and fixtures may be connected or the fixtures may be removed and the valve inserted to prevent escape of gas, and the portion of coupling in view within the room be rendered of an ornamental or finished appearance by reason of the plate and valve.

Figure 2:
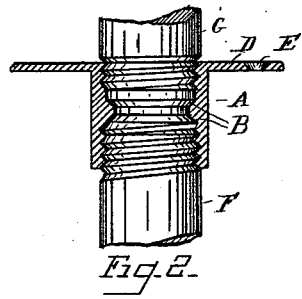
Figure 3:
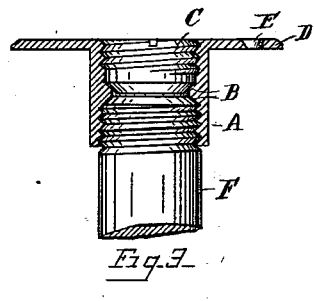
Figure 4:

In the drawings, Figure 1 illustrates the coupling and plate, with the service-pipe and fixtures connected. Fig. 2 is a longitudinal vertical sectional view of the coupling and plate, with the two pipes coupled therewith. Fig. 3 is a longitudinal vertical sectional view of the coupling and plate, with the service-pipe in connection and the valve in place upon the valve-seat. Fig. 4 is a detail view of the valve.

A designates the coupling comprising a tubular extension, screw-threaded at each end and having a valve-seat B intermediate its length, the valve-seat being preferably formed with like surfaces upon each side to coact with a valve C, which when screwed into the coupling from either end seats upon the valve-seat and prevents escape of fluid.

D designates a plate formed integral with the coupling, and is provided with perforations E, by which to secure the same to the floor or wall of the building, said plate being preferably silver or nickel plated to present an ornamental appearance when in place.

In operation the tubular coupling A is passed through the floor or wall and the service-pipe F coupled therewith, (the plate D having been previously secured to the floor or wall,) and the pipe G leading to the fixtures connected therewith. When, however, the pipe G is removed, (as in the case of tenants vacating and the illuminating-gas fixtures are to be stored,) or when coupled with a natural-gas main and its use is to be discontinued during the heated term, when the said pipe G is removed valve C is inserted and screwed firmly upon valve-seat B, and the upper side of the valve being in a plane with plate D the floor or wall presents a finished appearance, as contradistinguished from the ordinary unsightly protruding pipes.

What I claim is—

1. A pipe-coupling having its two ends interiorly screw-threaded and a valve-seat arranged between said threaded portions, in combination with a screw-threaded valve adapted to engage the said seat, as and for the purpose set forth.

2. A pipe-coupling formed with a circular plate at one end, internal screw-threads at each end, and a valve-seat centrally thereof, with a screw-threaded valve adapted to close upon the valve-seat, as and for the purpose set forth.

3. A pipe-coupling provided with a double-faced valve-seat, screw-threads at each side thereof, in combination with a valve adapted to fit upon either side of the valve-seat, as and for the purpose set forth.

In testimony that I claim the foregoing as my own I hereby affix my signature in presence of two witnesses.

VALENTINE SEEGER.

Witnesses:
 WILLIAM WEBSTER,
 CARROLL J. WEBSTER.